March 2, 1965 J. M. NEIL 3,171,456
AUTOMATIC RESETTING SCREW HOLDING SCREWDRIVER
Filed March 20, 1962 2 Sheets-Sheet 1
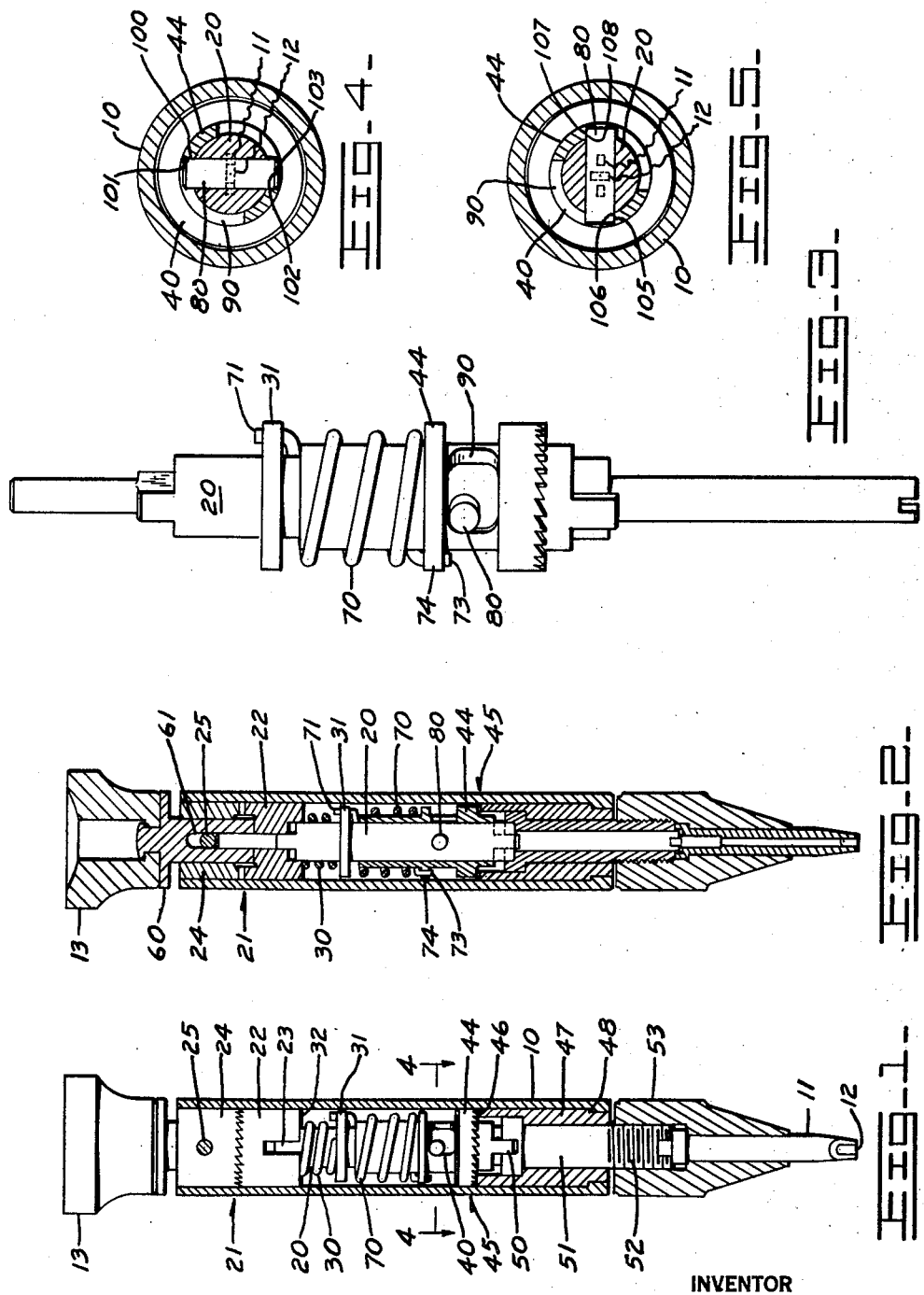
INVENTOR
JAMES M. NEIL
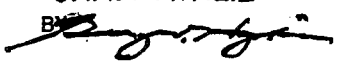
ATTORNEY March 2, 1965    J. M. NEIL    3,171,456
AUTOMATIC RESETTING SCREW HOLDING SCREWDRIVER
Filed March 20, 1962    2 Sheets-Sheet 2
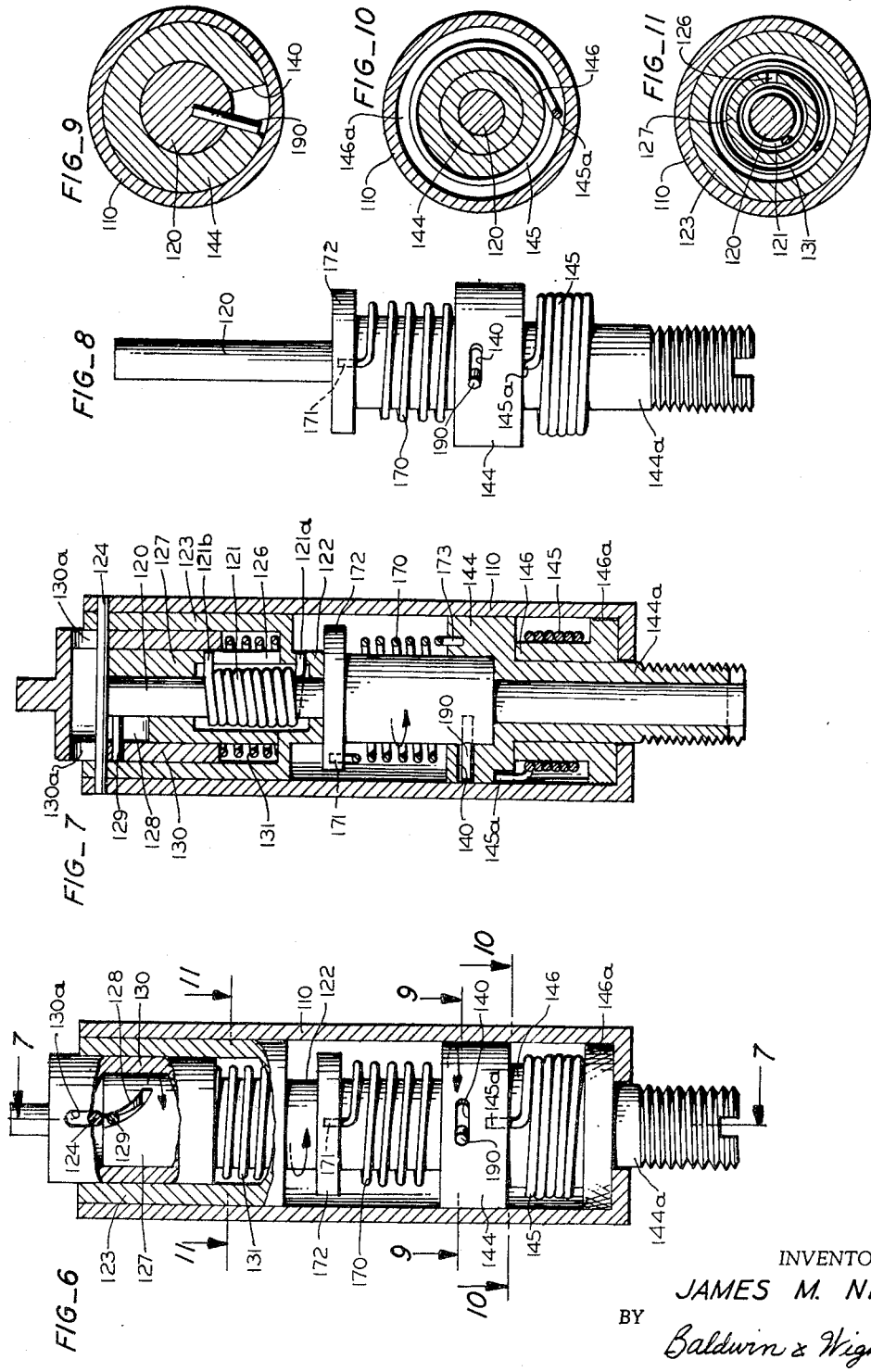
INVENTOR.
JAMES M. NEIL
BY Baldwin & Wight
ATTORNEYS United States Patent Office 3,171,456
Patented Mar. 2, 1965

3,171,456
AUTOMATIC RESETTING SCREW HOLDING
SCREWDRIVER
James M. Neil, 3017 Summit St., Oakland, Calif.
Filed Mar. 20, 1962, Ser. No. 181,142
24 Claims. (Cl. 145—50)

This invention relates to automatic resetting and screw-holding screw drivers (Class 145—50), and particularly to screw drivers of the type disclosed in the patent to Neil No. 2,745,451, issued May 15, 1956.

This application is a continuation in part of my co-pending application Serial No. 773,038, filed November 10, 1958, for Screw Driver, now abandoned.

The object of this invention is to facilitate the manufacture and reduce the cost of production of screw drivers of the aforementioned type.

Other objects and advantages will become evident in the following disclosure by reference to the drawings, wherein:

FIG. 1 is a vertical section of the screw driver with the encased mechanism in elevation.

FIG. 2 is a complete vertical section of the screw driver.

FIG. 3 is a detail of the cartridge which is pre-assembled and pre-adjusted before insertion in the barrel of the screw driver.

FIG. 4 is a detail cross-section on the line 4—4 of FIG. 1.

FIG. 5 is a detail cross-section on the line 4—4 of FIG. 1, with the parts disposed differently than in FIG. 4.

FIGS. 6 through 11 illustrate another preferred form of the invention:

FIG. 6 is a vertical section of the screw driver with the encased mechanism in elevation and certain parts broken away;

FIG. 7 is a complete vertical section of a central portion of the screw driver;

FIG. 8 is a detail of the cartridge which is pre-assembled and pre-adjusted for insertion in the barrel of the screw driver;

FIG. 9 is a detail cross-section on the line 9—9 of FIG. 6;

FIG. 10 is a detail cross-section on the line 10—10 of FIG. 6;

FIG. 11 is a detail cross-section on the line 11—11 of FIG. 6.

As shown in FIG. 1, one form of screw driver according to my invention is shown in its entirety. It consists of a barrel or handle 10 having rotatably mounted therein two screw engaging members as shown; a bit 11 and a gripping element 12, for relative rotation to grip a screw by engagement in the slot thereof in a well-known manner. It also has a freely rotatable finger-tip control button device 13 which is depressible to release the gripping element 12 to rotate relatively to the bit 11 to grip the screw by engagement in the slot thereof.

Encased within the barrel or handle 10 is the mechanism which makes this possible. It consists of a shaft part 20 which is connected to said barrel by a clutch 21 comprising an element or component 22 connected to said shaft by a tongue and groove connection 23 and another clutch element or component 24 secured to the barrel by a pin 25. A compression spring 30 is provided for closing the clutch 21. This spring is disposed between a collar 31 integral with shaft 20 and the underside 32 of clutch element 22.

As will be later explained, the ratchet teeth of the clutch 21 are so disposed as to oppose counter clockwise rotation of clutch element 22 relative to clutch element 24 (as viewed axially from the upper end of the screw driver).

Rotatably and slidably mounted on shaft 20 and connected thereto by a pin-and-slot connection 40 is another clutch element 44 which comprises part of a bit clutch 45. The extreme extent of rotation and of axial movement is fixed by the relative dimensions of the pin and of the slot. The other clutch element 46 is formed in the upper edge of a sleeve 47 inserted into and secured in the barrel and seating on the shoulder 48 formed therein. The clutch element or part 44 has a tongue and groove connection 50 with a sleeve 51 which has a rotatable bearing in the sleeve 47 and at its lower end is threaded at 52 to receive a finger piece 53. The finger piece 53 is provided to change bits 11 and holding elements 12 in a well-known manner.

Referring now to FIG. 2 which is a complete section of the screw driver, the parts heretofore described in FIG. 1 can be seen in more depth and detail so the description of FIG. 1 will not be repeated. Attention will now be drawn to construction that was not apparent in FIG. 1.

For example, note that button 13 swivels on the upper end of a plunger 60 which has a guide slot 61 on pin 25. This plunger engages lower clutch element 22, so that depression of button 13 through plunger 60 will depress clutch element 22 and open clutch 21, compressing spring 30.

Now we come to the function of the normally restrained spring 70 (FIGS. 1 and 2). It is both a torsion and a compression spring, although it has no compressive action on clutch 21. At the upper end 71 it is engaged in a hole in collar 31 integrally formed with shaft 20. At the lower end 73 it is engaged in a hole in a flange 74 of the upper clutch element 44 (FIG. 1) of clutch 45.

As will be described in greater detail later, the pin and slot connection 40 between the shaft 20 and the upper element 44 of the lower clutch 45 consists in a pin 80 (FIG. 2) inserted in a hole in shaft 20, the pin being received in a slot 90 in upper clutch element 44 for a purpose presently to be described.

The operation of the parts so far described is as follows: the operator engages the bit 11 (FIG. 1) and holding element 12 in the slot of the screw, then depresses button 13. Plunger 60 depresses lower clutch element 22 thus opening clutch 21. Spring 70 then turns the shaft 20 and the connected holding element 12 in the counter-clockwise sense, as viewed from above, relative to the bit 11 to grip the screw. The ratchet teeth of the clutch 45 are disposed to oppose clockwise rotation of the clutch 44 as viewed from the top of FIGS. 1 and 2, so that the clutch 45 holds the lower end 73 of the spring 70 and the bit 11 stationary during the counterclockwise rotation of the shaft 20. The element 12 and bit 11, having gripped the screw, the button 13 is released, enabling the axial loading of the spring 30 to close the clutch 21. When the gripped screw is inserted and screwed in, eventual tightening of the screw will set up a torque reaction exceeding the torsional action of the spring 70, whereupon the bit 11 will stand still while the handle 10 together with the shaft 20 and holding element 12 will turn clockwise relatively to the bit 11. During this turning of the handle 10 and shaft 20 while the bit 11 is stationary, the teeth of the clutch element 46 will slip over the teeth on the clutch element 44, then being held stationary by the bit 11 and sleeve 51. The clockwise sense rotation of the collar 31 on shaft 20 relative to the flange 74 on the upper clutch element 44 will re-torsion the spring 70 and restore the holding element 12 to its position parallel to the tip of the bit, as shown in FIG. 1. At the conclusion of this spring re-torsioning rotation of the handle 10 and shaft 20, the pin 80 on the latter will engage the left side of the slot 90, as viewed in FIGS. 1 and 3, and continued clockwise rotation of the handle, closed clutch 21, and shaft 20 will turn the clutch element 44, the sleeve 51 and the bit 11 to drive the screw home. When bit 11 is then removed from the screw slot, the holding element 12 will be in its FIG. 1 position in readiness for insertion, together with bit 11, into the slot of another screw. If button 13 should be depressed when bit 11 is not in a screw slot with resultant torsional unloading of spring 70 and turning of the holding element 12 crosswise of the bit 11, the spring may be re-torsioned and the holding element re-set in parallelism with bit 11 by holding finger-piece 53 and turning handle 10 clockwise.

Having correlated the present application with said patent we shall now explain the reasons for certain structural changes. First of all, it was found very difficult to check the dimensions of the ratchet teeth in the bottom of the barrel. They were stamped in and it took a very laborious and expensive process to check them for proper height, burrs, etc. This problem was solved by forming the teeth on the upper edge of the sleeve 47 that could be secured in the barrel. That way the teeth could be checked before assembly and this resulted in a decrease in production costs.

But the big problem was the torsion spring. It had to be assembled blind and tensioned and connected to the upper clutch—in fact, the entire mechanism had to be assembled in the barrel before it could be pinned.

The inventor solved this problem in an ingenious way which will now be described. He devised a cartridge which is shown in its entirety in FIG. 3.

First of all, its structure will be further described and then its utility. At the outset we wish to emphasize that whereas the original screw driver was assembled part by part, this sub-assembly or cartridge, as we choose to call it, can be assembled, inspected, checked for dimension and preset ready for immediate action merely by inserting this cartridge in the barrel of the screw driver. The cartridge is shown in FIG. 3. It comprises the shaft 20 (see FIGS. 1 and 2) upon which all the components are mounted in operative condition. The clutch element 44 is assembled on this shaft together with the torsion spring 70. The torsion spring is engaged at its upper end 71 with the collar 31 formed on the shaft 20 and the lower end 73 is engaged in the flange 74 of the clutch element. Now the clutch element is turned to tension the spring to the precise tension required. Next the pin 80 is introduced through the slot 90 in the clutch element 44. Now the cartridge is complete and can be inserted into the barrel merely by engaging the teeth of the clutch 45. Here is a self-contained unit: prefabricated, pre-set and ready to function merely by insertion in the barrel and engaging the clutch elements.

After that all that is necessary is to drop in the compression spring 30, the clutch parts 21, the plunger 60 and its button 13 and insert the pin 25 and the job is done.

A word about the functioning of the pin-and-slot connection 40. Referring to FIG. 4 the pin 80 is shown in its normal position where the bit 11 and the holding element 12 are flush. The pin 80 is rigidly mounted in the shaft 20. Its edge 100 engages the edge 101 of the slot 90 (FIG. 3) in clutch element 44 and its edge 102 engages the edge 103 of said slot. This is the standard screw driver position with bit 11 and holding element 12 flush.

Referring to FIG. 5, this illustrates the limit of travel of the pin in the slot. Of course, in gripping most screws it would be in some intermediate position depending on the width of the slot. It shows pin 80 rotated 90 degrees with its edge 106 engaging the edge 105 of the slot 90 and its edge 108 engaging edge 107 of the slot. When the holding element 12 is returned to a position flush with bit 11, either manually by turning finger piece 53, or automatically as described, the pin returns to the position shown in FIG. 4.

In the form of the invention shown in FIGS. 6–11 certain similar parts have been omitted such as the bit 11 and the gripping element 12, together with the finger piece 53, as well as the fingertip control button device 13. The mechanism of this modification which controls the relative movement of the bit 11 and the gripping element 12 is generally similar in construction and mode of operation to that shown in the modification of FIGS. 1 through 5.

The mechanism itself comprises a shaft part 120 (FIGS. 6 and 7) which is connected to the barrel 110 by annular clutch means including clutch spring 121 whose inner diameter is such that it grips the shaft 120 and holds it against rotation. The clutch spring 121 has one end 121a anchored in a reduced portion 122 of a sleeve 123 which is secured to the barrel 110 by a pin 124. Thus the end 121a of the spring 121 is held in fixed relation to the barrel 110. The upper end 121b of the spring 121 is seated and anchored in a vertical slot 126 of a control sleeve 127, the slot 126 being only slightly wider than the spring end 121b. Control sleeve 127 has a helical or inclined cam groove 128 engaged by a pin 129 carried by an actuating or release sleeve 130 which is normally urged upwardly in the position shown by a compression spring 131. The actuating sleeve 130 has aligned vertical slots 130a which are engaged by the pin 124 and which limit its vertical movement.

From the above description, it will be seen that with the parts positioned as shown in FIGS. 6 and 7, the clutch spring 121 positively locks the shaft 120 to the casing 110. It will also be seen that when the release sleeve 130 is depressed against the urge of the compression spring 131, the pin 129 through the cam groove 128 causes rotation of the control sleeve 127 in a clockwise direction, as viewed axially from above, and that this will cause movement of the spring end 121b clockwise while the spring end 121a is held stationary, and will therefore effect loosening of the spring 121 from the shaft 120 and release the shaft 120. The clutch spring 121 in cooperation with its control parts therefore comprises annular clutch means releasable by a control movement to provide for or allow relative movement between the casing 110 and the shaft 120.

The purpose of the above clutch mechanism will be described hereinafter.

Rotatably mounted on shaft 120 (FIGS. 6 and 7) and connected thereto by a pin and slot connection 140–190 is a sleeve 144 having the upper end 145a of a clutch spring 145 anchored therein. This clutch spring 145 grips a reduced shoulder or annular portion 146 of a sleeve having its enlarged lower end 146a knurled and press-fitted within the casing 110. The spring 145 acts as a one-way clutch and is wound in a fashion so that it positively resists clockwise movement of the sleeve 144 and the spring 145 with respect to the casing 110, as viewed axially from above, but will permit clockwise movement of the casing 110 with respect to the spring 145 and the sleeve 144. As seen most clearly in FIG. 7, the sleeve 144 is provided with a downward extension 144a which is threaded to receive the finger piece 53, and is slotted at its end for driving engagement with a bit 11.

From the above description it will be seen that the spring 145 provides a one-way clutch connection of annular construction with the sleeve 146 which permits clockwise movement of the sleeve 146 and casing 110 relative to the sleeve 144. The purpose of this lower annular clutch mechanism or one-way drive connection will be apparent from a later description of its operation.

The function of the normally restrained spring 170 is similar to that of the spring 70 previously described in connection with FIG. 1, as both a torsion and a compression spring. However, the spring 170 shown in FIG. 6 acts as a torsion spring only. At its upper end 171 it is engaged in a hole in collar 172 integrally formed with the shaft 120. At its lower end 173 it is engaged in a hole in the sleeve 144 forming a part of the lower clutch mechanism.

The operation of the parts is generally similar to that described in connection with the modification of FIGS. 1 through 5 and will be summarized generally. The operator engages the bit 11 together with the holding element 12 in the slot of the screw and then depresses the button 13. Plunger or control sleeve 130, upon being depressed, operates through the pin 129 and cam groove 128 to rotate the control sleeve 127 in a clockwise direction, thereby rotating the upper end 121b of the spring 121 slightly in a clockwise direction as viewed from above and releasing the shaft 120 from the holding action of this upper clutch mechanism. Spring 170 then turns the shaft 120 and the connected holding element 12 counter clockwise, as viewed from above, relative to the bit 11 to grip the screw. The pin 190 moves from its position shown in FIGS. 6 and 8, for example, either for the full extent of the slot 140 or for a lesser extent, depending upon the width of the slot of the screw. At this time, the element 12 and the bit 11, having gripped the screw, the button 13 is released, enabling return of the spring 121 to holding position with reference to the shaft 120 which is again in effect rigidly connected to the casing 110.

When the gripped screw is inserted and screwed in, eventual tightening of the screw will set up a torque reaction exceeding the torsional action of the spring 170, as previously explained in connection with the spring 70, whereupon the bit 11 will stand still while the handle 110, together with the shaft 120 and the holding element 12, will turn clockwise relative to the bit 11, the clutch spring 145 permitting this type of relative rotation between the handle 110 and the sleeve 144. The clockwise rotation of the collar 172 on shaft 120 relative to the sleeve 144 will retension the spring 170 and restore the holding element 12 to its position parallel to the tip of the bit, as illustrated in connection with the modification in FIGS. 1 through 5. The movement of the casing 110, the shaft 120, and the holding element 12 during this clockwise movement results in movement of the sleeve 146 within the one-way clutch spring 145 and relative to the sleeve 144 and the bit 11. This movement continues until the pin 190 is again at the left hand end of the slot 140, as seen in FIG. 6, when continued rotation of the handle 110 will result in the tool acting as a conventional screw driver, the holding element 12 having been brought into alignment with the bit 11.

The cartridge of the modification of FIGS. 6 through 11 is shown as a unit in FIG. 8 and comprises the shaft 120 upon which all the cartridge components are mounted in operative condition. The sleeve 144, together with its spring 145, is assembled on the shaft 120 together with the torsion spring 170, and the torsion spring is engaged at its upper end with the collar 172 of the shaft 120 and its lower end 173 is engaged with its seat in the sleeve 144. Now the sleeve 144 is turned to tension the spring 170 to the precise tension required and then the pin 190 is introduced through the slot 140 in the sleeve 144 and secured to the shaft 120.

Now the cartridge is complete and can be inserted into the barrel 110 merely by turning counter-clockwise relatively to the barrel until the lower clutch spring 145 encompasses the reduced portion of the insert 146. The other cooperating parts are assembled on the upper portion of shaft 120 as follows: the lower end 121a of clutch spring 121 is introduced into the sleeve 123 and the lower end 121a of the spring is anchored in the aperture in the reduced portion 122 of the sleeve 123. Control sleeve 127 is now introduced into sleeve 123 and over clutch spring 121, the spring upper end 121b readily entering accommodating longitudinal slot 126 to become seated and secured to sleeve 127 at the upper end of slot 126. Compression spring 131 is now dropped over sleeve 127 to be contained in its accommodating space between the outside diameter of sleeve 127 and the inside diameter of the sleeve 123 with the bottom of the spring 131 seated on the shoulder on the sleeve 123 at the bottom of the spring-accommodating space. Activating sleeve 130 is now introduced over control sleeve 127, pin 129 engaging the upper end of cam slot 128. At this time a temporary long pin, corresponding to the pin 124, is used to align the holes in the upper end of sleeve 123 and the slots 130a of sleeve 130. Using this long pin to stabilize sleeve 123, pressure is made on sleeve 130 until clutch spring 121 is sufficiently opened to permit easy introduction of the upper end of shaft 120 into clutch spring 121 to the position it will ultimately occupy. This entire assembly, with the shaft 120, is then introduced into the barrel by substituting a short temporary pin for the long pin corresponding to pin 124, so that the ends will permit insertion within the barrel. Thereafter, the barrel and the assembly within it are aligned so that the holes at the upper end are in alignment and the temporary pin is expelled, using the permanent assembly pin 124.

While I have shown and described certain preferred forms of the invention, it will be apparent that the invention is capable of variation and modification from the forms shown so that the scope thereof should be limited only by the proper scope of the claims appended hereto.

I claim:

1. A screw driver of the automatic resetting, screw-holding type of the class described, having a barrel, a bit for turning the screw, an element rotatable in said bit for holding the screw, and a mechanism encased in said barrel for controlling rotation of said bit and said element relative to said barrel, said mechanism comprising a first one way clutch operable for resisting rotation of said bit relative to said barrel, a second one way clutch operable when closed for resisting rotation of said element relative to said barrel, a first spring urging said first clutch closed, a second spring urging said second clutch closed, and means torsionally connecting said first spring between and to said bit and said element for urging the latter to turn relatively to said bit.

2. A screw driver of the automatic resetting, screw-holding type of the class described, having a barrel, a bit for turning the screw, an element rotatable in said bit for holding the screw, and a mechanism encased in said barrel for controlling rotation of said bit and said element relative to said barrel, said mechanism comprising a first one way clutch operable for resisting rotation of said bit relative to said barrel, a second one way clutch operable when closed for resisting rotation of said element relative to said barrel, a first spring urging said first clutch closed, a second spring uging said second clutch closed, means torsionally connecting said first spring between and to said bit and said element for urging the latter to turn relatively to said bit, and means for opening said second clutch against the closing urge of said second spring for enabling the torsionally connected spring to turn said element relatively to said bit.

3. A screw driver of the automatic resetting, screw-holding type of the class described, having a barrel, a bit for turning the screw, an element rotatable in said bit for holding the screw, and a mechanism encased in said barrel for controlling rotation of said bit and said element relative to said barrel, said mechanism comprising two clutches, one to control rotation of said bit in said barrel, another to control rotation of said holding element in said barrel, a spring urging rotation of said bit and said holding element in opposite directions and normally holding said one clutch closed, another spring urging said other clutch closed, and means for opening said other clutch against the urge of said other spring.

4. A screw driver of the automatic resetting, screw-holding type of the class described, having a barrel, a clutch element secured in said barrel, a bit for turning the screw, and a cartridge sub-assembly pre-assembled and pre-adjusted before insertion in said barrel, said cartridge sub-assembly comprising a second clutch element, means for connecting said second clutch element to said bit, a spring connected to said second clutch element, and means independent of said barrel for holding said spring and said second clutch element in assembled connected relation, whereby upon insertion of said pre-assembled, pre-adjusted cartridge into said barrel, said two clutch elements are engaged to form a clutch between said bit and said barrel under the control of said spring.

5. A screw driver of the automatic resetting, screw-holding type of the class described, having a barrel, a clutch element secured in said barrel, a bit for turning the screw, and a cartridge sub-assembly pre-assembled and pre-adjusted before insertion in said barrel, said cartridge sub-assembly comprising a second clutch element, means for connecting said second clutch element to said bit, a combined torsion and compression spring connected to said second clutch element and means independent of said barrel for holding said spring and said second clutch element in assembled connected relation with said spring stressed in both torsion and compression, whereby upon insertion of said pre-assembled, pre-adjusted cartridge into said barrel, said two clutch elements are engaged to form a clutch between said bit and said barrel under the compressive urge of said spring and said second clutch element is urged to rotate by the spring torsion.

6. A screw driver of the automatic resetting, screw-holding type of the class described, having a barrel, a first clutch element secured in said barrel, a bit for turning the screw, an element rotatable in the bit for holding the screw, a pre-assembled and pre-adjusted mechanism for controlling rotation of said bit and said element relatively to one another and to said barrel, said mechanism being insertable into and removable from said barrel as a unit and comprising a central shaft on which all the components of the mechanism are mounted, said components including a second clutch element operatively engaged with said first clutch element when said mechanism is inserted in said barrel as a unit, a third clutch element connected to said shaft and being cooperable with said barrel when said mechanism is inserted therein, a compression spring tending to close said clutch elements, and a torsion spring tending to rotate the bit and the holding element in opposite directions.

7. A mechanism sub-assembly for a screw-holding screw driver comprising a central shaft; a clutch element rotatable on said shaft; a combined pre-stressed torsion and compression spring connected to said shaft and to said clutch element for urging said shaft and said clutch element to rotate relatively and to move axially relatively to each other; a pin and slot connection comprising parts respectively on said clutch element and on said shaft engageable with each other for limiting rotation of said clutch element relative to said shaft and for limiting the relative axial movement of said clutch element and shaft thereby to prevent said clutch element from being axially separated from said shaft, and thus to retain said shaft, said clutch element and said spring in assembled relation.

8. In a screw driver of the automatic resetting screw-holding type, a barrel; a bit; a screw-holding element; means mounting said bit and said element for rotation relative to said barrel and to each other; a shaft mounted for rotation in said barrel; a first clutch resisting rotation of said shaft relative to said barrel; a spring for urging said first clutch closed; a second clutch including a movable clutch part mounted on said shaft for movement relative thereto and a fixed clutch part on said barrel; means for limiting movement of said moveable clutch part relative to said shaft; a combined torsion and compression spring for urging said movable clutch part into engagement with said fixed clutch part and for urging said shaft to rotate relatively to said movable clutch part; and means for connecting said movable clutch part and said shaft respectively to said bit and said element.

9. Screw driver construction according to claim 8 comprising a separately formed insert secured within said barrel and being formed to constitute said fixed clutch part.

10. In a screw driver of the automatic resetting screw-holding type, a barrel; a bit; a screw holding element; means mounting said bit and said element for rotation relative to said barrel and to each other; a shaft mounted for rotation in said barrel; a first clutch resisting rotation of said shaft relative to said barrel; a spring for urging said first clutch closed; a second clutch including a movable clutch part mounted on said shaft for movement relative thereto and a fixed clutch part on said barrel; a pin and slot connection between said shaft and said movable clutch part in which connection said slot is of greater dimension than said pin both axially and circumferentially of said shaft, whereby to permit limited relative axial and turning movement of said shaft and said movable clutch part; a combined torsion and compression spring for urging said movable clutch part into engagement with said fixed clutch part and for urging said shaft to rotate relatively to said movable clutch part; and means for connecting said movable clutch part and said shaft respectively to said bit and said element.

11. A screw driver of the automatic resetting, screw-holding type of the class described, having a barrel, a bit for turning the screw, an element rotatable in the bit for holding the screw, and a mechanism encased in said barrel for controlling rotation of said bit and said element relative to one another and to said barrel, said mechanism including releasable annular clutch means in said barrel and a cartridge sub-assembly in said barrel, said cartridge sub-assembly comprising a central shaft member, a clutch member rotatably mounted on and carried by said shaft member and being engageable with said clutch means, spring means urging said members to rotate relatively to one another, means independent of said barrel for holding said spring and said clutch member in assembled connected relation, means for limiting relative rotation between said members, and means for connecting said members respectively, to said bit and said element, said cartridge sub-assembly being insertable into and removable from said barrel as a unit.

12. A mechanism sub-assembly for a screw-holding screw driver comprising a central shaft; a clutch element rotatable on said shaft; a pre-stressed torsion spring connected to said shaft and to said clutch element for urging said shaft and said clutch element to rotate relatively to each other; and means respectively on said clutch element and on said shaft engageable with each other for limiting rotation of said clutch element relative to said shaft and for restraining relative axial movement of said clutch element and said shaft thereby to prevent said clutch element from being axially separated from said shaft, and thus to retain said shaft, said clutch and said spring in assembled relation.

13. A mechanism sub-assembly for a screw-holding screw driver comprising a central shaft; a clutch element rotatable on said shaft; a combined pre-stressed torsion and compression spring connected to said shaft and to said clutch element for urging said shaft and said clutch element to rotate relatively and to move axially relatively to each other, and means respectively on said clutch element and on said shaft engageable with each other for limiting rotation of said clutch element relative to said shaft and for limiting the relative axial movement of said clutch element and said shaft thereby to prevent said clutch element from being axially separated from said shaft, and thus to retain said shaft, said clutch element and spring in assembled relation.

14. A screw driver of the automatic resetting, screw-holding type comprising a barrel, a bit extending from within said barrel outwardly thereof for turning a screw, a screw-holding element rotatable within said bit and extending from within said barrel outwardly thereof through said bit for holding the screw, both said bit and said holding element being rotatable within and relatively to said barrel, and a mechanism encased within said barrel for controlling relative rotation of said bit and said element for gripping and releasing a screw in the slot of which said bit and said element are received, said mechanism including a first spring urging said bit and said element to rotate in opposite directions, means including a clutch for normally restraining said element from rotating relatively to said bit, said clutch including two cooperating annular clutch components, both within said barrel and being operable for effecting relative rotation between said element and said bit in one sense against the urge of said first spring to set said element relatively to said bit to enable simultaneous entry of said bit and said element into a screw slot, a second spring disposed in axial alignment with and acting axially of said barrel, said bit and said element solely for releasably holding said clutch closed and thus holding said element in the set position when set therein, and means operable axially of said barrel for opening said clutch thereby to enable said first spring to rotate said element in the opposite sense relatively to said bit to dispose said element in screw holding position.

15. A screw driver of the automatic resetting, screw-holding type comprising a barrel, a bit extending from within said barrel outwardly thereof for turning a screw, a screw-holding element rotatable within said bit and extending from within said barrel outwardly thereof through said bit for holding a screw, both said bit and said holding element being rotatable within and relatively to said barrel, and a mechanism encased in said barrel for controlling relative rotation of said bit and said element for gripping and releasing a screw in the slot of which said bit and said element are received, said mechanism including a torsion spring urging said bit and said element to rotate in opposite directions, means including a clutch for normally restraining said element from rotating relatively to said bit, said clutch including two cooperating annular clutch components, both within said barrel and being operable for effecting relative rotation between said element and said bit in one sense against the urge of said torsion spring to set said element relatively to said bit to enable simultaneous entry of said bit and said element into a screw slot, a compression spring disposed in axial alignment with and acting axially of said barrel, said bit and said element solely for releasably holding said clutch closed and thus holding said element in the set position when set therein, and means operable axially of said barrel for opening said clutch against the force of said compression spring thereby to enable said torsion spring to rotate said element in the opposite sense relatively to said bit to dispose said element in screw holding position.

16. A screw driver of the automatic resetting, screw-holding type comprising a barrel, a bit extending from within said barrel outwardly thereof for turning a screw, a screw-holding element rotatable within said barrel extending outwardly thereof through said bit for holding a screw, both said bit and said holding element being rotatable within and relatively to said barrel, and a mechanism encased in said barrel for controlling relative rotation of said bit and said element for gripping and releasing a screw in the slot of which said bit and said element are received, said mechanism including a pre-loaded torsion spring urging said bit and said element to rotate in opposite directions, means including a toothed clutch for normally restraining said element from rotating relatively to said bit, said toothed clutch including two mutually engageable annular sets of multiple teeth, both in said barrel and opposing each other axially of said barrel and being operable for effecting relative rotation between said element and said bit in one sense against the urge of said torsion spring to set said element relatively to said bit to enable simultaneous entry of said bit and said element into a screw slot, a compression spring disposed axially of said barrel and acting within said barrel axially of said bit and said element solely for releasably holding said sets of teeth operatively engaged with each other and thus holding said element in the set position when set therein, and means operable axially of said barrel for disengaging one of said sets of clutch teeth from the other thereof against the axial compressive action of said compression spring thereby to enable said torsion spring to rotate said element in the opposite sense relatively to said bit to dispose said element in screw holding position.

17. A screw driver of the automatic resetting, screw-holding type of the class described, having a barrel, a bit for turning the screw, an element rotatable in said bit for holding the screw, and a mechanism encased in said barrel for controlling rotation of said bit and said element relative to each other and to said barrel, said mechanism comprising a normally engaged first annular clutch including a first spring operable for resisting rotation of said bit relative to said barrel in one direction only, a normally engaged second annular clutch including a second spring operable for resisting rotation of said element relative to said barrel, and spring means torsionally connected to and between said bit and said element for urging the latter to turn relative to said bit.

18. A screw driver of the automatic resetting, screw-holding type of the class described, having a barrel, a bit to turn the screw, an element rotatable in said bit for holding the screw, and a mechanism encased in said barrel for controlling rotation of said bit and said element relative to each other and to said barrel, said mechanism comprising an annular one-way drive connection for resisting rotation of said bit relative to said barrel in one direction only, a normally locked annular releasable drive connection operable for resisting rotation of said element relative to said barrel, spring means torsionally connected to and between said bit and said element for urging the latter to turn relative to said bit, means for releasing said releasable drive connection for enabling the torsionally connected means to turn said element relative to said bit, and a spring spaced from said spring means for resisting operation of said releasing means.

19. In a screw driver of the automatic resetting screw-holding type, a barrel, a bit, a screw-holding element, means mounting said bit and said element for rotation relative to said barrel and to each other, a shaft mounted for rotation in said barrel, a releasable drive connection resisting rotation of said shaft relative to said barrel, a one-way drive connection including a part mounted on said shaft for limited movement relative thereto, a fixed part on said barrel, and an annular spring connected to said movable part and engaging around said fixed part, means for limiting movement of said movable part relative to said shaft, a torsion spring for urging said shaft to rotate relative to said movable part, and means for connecting said movable part and said shaft respectively to said bit and said element.

20. In a screw driver of the automatic resetting screw-holding type, a barrel, a bit, a screw-holding element, means mounting said bit and said element for rotation relative to said barrel and to each other, a shaft mounted for rotation in said barrel, a releasable drive spring resisting rotation of said shaft relative to said barrel, a movable member mounted on said shaft for limited rotative movement thereon, a one-way drive spring between said member and said barrel, a torsion spring for urging said shaft to rotate relative to said movable member, and means for connecting said movable member and said shaft respectively to said bit and said element.

21. A screw driver of the automatic resetting, screw-holding type of the class described, having a barrel, a clutch element in said barrel, a bit for turning the screw, and a cartridge sub-assembly pre-assembled and pre-adjusted before insertion into the barrel, said cartridge sub-assembly comprising a second clutch element, a spring connected to said second clutch element, and means independent of said barrel for holding said spring and said second clutch element in assembled connected relation, whereby upon insertion of said pre-assembled pre-adjusted cartridge into said barrel, said two clutch elements are engaged to form a clutch between said bit and said barrel under the control of said spring, said two clutch elements comprising respectively a stationary sleeve in said barrel and a one-way annular spring carried by said cartridge sub-assembly and encompassing said sleeve.

22. A mechanism sub-assembly for a screw-holding screw driver comprising a central shaft, a clutch element rotatable on said shaft, a pre-stressed torsion spring connected to said shaft and to said clutch element for urging said shaft and said clutch element to rotate relative to each other, a limited-motion connection comprising parts respectively on said clutch element and on said shaft engageable with each other for limiting rotation of said clutch element relative to said shaft and for limiting relative axial movement of said clutch element and said shaft, thereby to prevent said clutch element from being axially separated from said shaft, and thus to retain said shaft, said clutch, and said spring in assembled relation, said shaft having respective projecting end portions formed for connection to associated parts of said screw driver by relative axial movement, and said clutch element having an extension formed for connection to another associated part of said screw driver by relative axial movement.

23. A mechanism sub-assembly for a screw-holding screw driver comprising a central shaft, a clutch element rotatable on said shaft including an annular spring, a pre-stressed torsion spring conected to said shaft and to said clutch element for urging said shaft and said clutch element to rotate relative to each other, a limited-motion connection comprising parts respectively on said clutch element and on said shaft engageable with each other for limiting rotation of said clutch element relative to said shaft and for limiting relative axial movement of said clutch element and said shaft, thereby to prevent said clutch element from being axially separated from said shaft, and thus to retain said shaft, said clutch, and said springs in assembled relation, said shaft having respective projecting end portions formed for connection to associated parts of said screw driver by relative axial movement, said annular spring forming an extension and said clutch element having another extension formed for connection to associated parts of said screw driver by relative axial movement.

24. An automatic resetting screw-holding screw driver, having a barrel, two screw-engaging members mounted coaxially of said barrel for rotation relative to each other and to said barrel, a normally restrained spring coaxial of said barrel and said members carried by and urging said members in opposite directions, a device mounted coaxially with said barrel for cooperation with said barrel upon movement with respect thereto to release said normally restrained spring, and yieldable means mounted in spaced relation from said spring for resisting said movement of said directions.

References Cited in the file of this patent
UNITED STATES PATENTS

| | | |
|---|---|---|
| 2,566,683 | Thompson | Sept. 4, 1951 |
| 2,745,451 | Neil | May 15, 1956 |
| 2,748,816 | Neil | June 5, 1956 |